Feb. 18, 1958     C. DONALDSON     2,824,033

PROCESS OF MANUFACTURING COMPOSITE PIPE

Filed March 1, 1955

INVENTOR
CHASE DONALDSON

United States Patent Office 2,824,033
Patented Feb. 18, 1958

2,824,033

PROCESS OF MANUFACTURING COMPOSITE PIPE

Chase Donaldson, Mount Vernon, N. Y.

Application March 1, 1955, Serial No. 491,519

4 Claims. (Cl. 154—83)

The present invention relates to tubular conduits composed of spaced concentric tubes of synthetic resinous material united by an integral reinforcement and more particularly to a continuous method of manufacture thereof.

Spirally wound tubing formed from resin impregnated tapes of woven glass fibers, paper and/or paper-glass fiber laminates are readily acceptable to industry for use as conduits and piping for corrosive liquids. Reinforced plastic tubing of this type normally has high burst values but a low modulus of elasticity. This type of tubing is also marred by variations in structural strength occasioned by faulty processing techniques.

In my application for Letters Patent Serial No. 479,723, filed January 4, 1955, there is disclosed a novel type of composite piping which obviates many of the disadvantages of prior art structures.

It is a principal object of the present invention to provide a method for the substantially continuous production of a composite pipe composed of spaced, concentric, reinforced plastic tubes united by integral filling of high compressive strength.

A second object of my invention is the provision of a method for the substantially continuous production of a composite pipe which enables the formation of reinforced tubing in a direct, efficient operation entailing a minimum of handling.

A further object of the invention is the provision of a method for the substantially continuous production of a composite pipe susceptible of ready modification to vary the physical characteristics of the ultimate product as desired.

A still further object of my invention is to provide a method for the substantially continuous production of composite pipe having uniform structural properties of readily predictable values.

Figure 1:
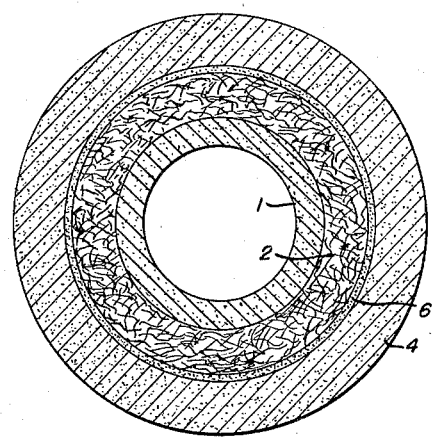
Figure 2:
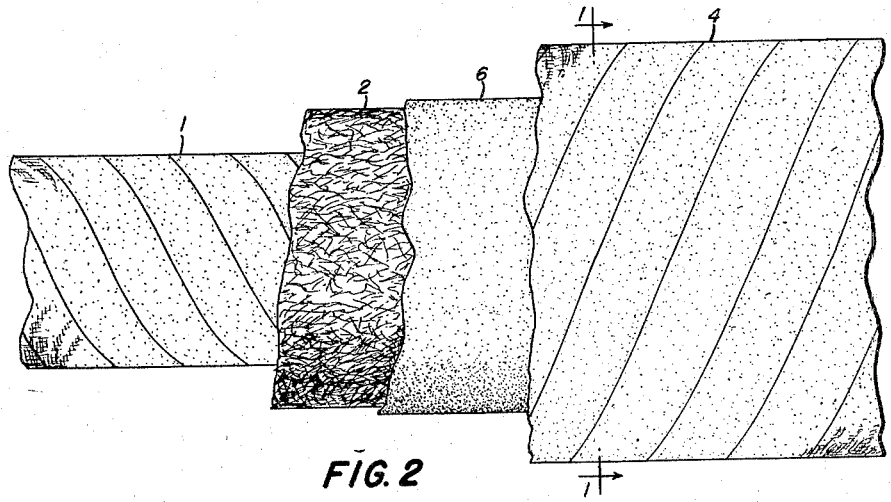

Other objects and advantages of the invention will be readily apparent from the following detailed description of certain preferred embodiments thereof when taken in conjunction with the accompanying drawing wherein:

Figure 1 is a vertical section of a composite pipe constructed in accordance with my invention; and Figure 2 is a fragmentary elevation thereof with portions of the several strata broken away.

Briefly stated, the present invention contemplates the separate formation of the tubular elements entering into the composite pipe assembly, the direct addition of the necessary reinforcement and/or filler to the inner element as an incident of the formation thereof, activation of such reinforcement, assembly of the elements, and effecting a bonding lamination therebetween at the same time the resin content of the assembly is cured.

The spiral winding of the resin impregnated tapes into tubes is well known and requires but little description here. Tube winders capable of depositing a plurality of tape plies in succession onto a fixed mandrel from which the tube is forced as it is formed by the action of driving belts are commercially available today. A standard spiral winder of this type can be employed to apply helically any desired number of resin impregnated tapes to build up a specified thickness of tube wall. For example, 6 plies of 0.012" preimpregnated asbestos tape would build up the wall thickness of the tube to 0.072". By positioning all of the tapes at the same angle of wind, either left hand or right hand, there is experienced no difficulty in producing the tube. Also, inasmuch as the winding heads can be adjusted to feed the impregnated tapes at a constant, controllable tension the ultimate tube will meet the established specifications therefor.

In the formation of spirally wound tubes of resin impregnated tapes, it is even possible to build up initially a base tube of heavy craft or chipboard paper to serve as a supporting form for the resin-tape tubing. In this instance, it is desirable to apply a parting layer of regenerated cellulose film or comparable sheet material to the cardboard form to facilitate its removal from the ultimate product.

It is, therefore, intended that the inner element 1 of the composite pipe of this invention be wound on a preliminary fabricated cardboard form coated with a layer of parting material.

To the inner element is then applied a plurality of windings 2 of filler material which is preferably composed of coarse asbestos fibers admixed with a cellulated clay or comparable light weight aggregate extender and compressed in paper or mat form. The asbestos fiber or mat may also contain short random length pieces of glass fiber as additional reinforcement and may include a resin binder for the several components insuring therein adequate integration to permit handling. The added windings of filler material will be of sufficient thickness to fill substantially the space between the inner and outer shell element of the composite pipe. The last ply or plies of filler material could conveniently consist of a calendered glass cloth reinforced asbestos paper to provide finish and additional strength to this intermediate lamina. Additionally, the smoother finish so provided will simplify subsequent assembling of the composite pipe.

In a similar fashion, the outer element 4 of the composite pipe is prepared. Any desired number of plies of resin impregnated fibrous material of proper specifications are wound on a preformed rotating cardboard tube or a fixed mandrel to provide a wall of specified thickness. It is, of course, essential that the inner diameter of the outer shell element, as determined by the outer diameter of the cardboard form or fixed mandrel upon which it is wound, be at least equal to and preferably slightly larger than the outer diameter of the inner shell element with the added intermediate layer of filler material. There is no particular limitation on the outer diameter of the outer shell element.

In order that the ultimate pipe will possess maximum strength, it is intended that the windings of the outer shell element be in the opposite direction to those of the inner shell element. That is, if the inner shell has a left hand wind, the outer shell will have a right hand wind. The angles of wind in the two elements can be varied independently and at will to provide considerable latitude in the compression, burst and axial values of the ultimate product.

Segments of uniform length, as for example 20 feet for commercial units, are cut from the continuously produced inner and outer shell elements to facilitate the subsequent assembling thereof.

The segments of the outer shell element 4 are subjected to heat and/or pressure to effect a polymerization or cure of the resin content thereof. It is preferred to employ the process disclosed in my copending application Serial No. 434,325, filed June 3, 1954, in this operation although other known methods of completing resinification in situ of a binding matrix will serve equally as well. The cured segments of the outer shell are then stripped from their supporting forms and are ready for assembly.

The segments of the inner shell element 1 have applied to their outer surfaces an additional layer 6 of a thermosetting adhesive resin. This operation may conveniently be effected by positioning the segments upon spaced roller supports, partially submerged in a bath of the adhesive and revolving the segments until the required add-on of adhesive is secured. Absorption of the adhesive resin will, of course, be affected by the amount of binding resin incorporated in the outer layer of filler material, the density of such material and other contributing factors, such as the viscosity of the adhesive resin per se.

The inner and outer shell elements are now assembled, the adhesive layer on the outer surface of the inner shell acting somewhat as a lubricant to assist in its insertion into the outer shell. The assembly is rotated at relatively high speeds while subjected to sufficient heat to effect a cure of the adhesive resin in the intermediate layer as well as the bonding resin within the body of the inner shell element. Again it is preferred to employ the process covered in my copending application Serial No. 434,325, filed June 3, 1954, for this purpose although other processes will serve equally as well. It is only necessary that the composite pipe be spun at sufficiently high speed during the curing cycle to insure migration of the adhesive resin into contact with the interior surface of the outer shell. Th excess resin in the inner shell element and its intermediate filling layer plus the externally applied adhesive will fill the small space between the layer of filling material on the inner shell and the interior surface of the outer shell.

This migration of adhesive resin during the spin curing of the composite pipe enables the formation of an integrated moisture proof barrier between the inner and outer shell elements which will supplement the substantially impervious walls of the inner and outer shell elements per se.

After the final curing operation is completed, the composite pipe is separated from its supporting cardboard form and is ready for use.

As an alternative method of finishing the pipe assembling and insuring a strong and positive bond between the inner and outer shell elements, the innermost plies of the outer shell tube can be formed of a tape which is impregnated with an uncatalyzed resin while the remainder of the plies are of conventional composition, i. e., tape impregnated with a catalyzed resin. On curing this outer shell element, the inner plies thereof will not be affected. Upon placement of the inner shell and its superposed layers of filler material and adhesive resin within the outer shell and during the final spin curing of the composite pipe there will be sufficient catalyst movement from the migrating adhesive layer into the uncured inner layer of the outer shell to enable completion of the cure or polymerization of such interlayer and its integration with the bonding resin of the intermediate filler layer.

If it is desired, the superposed layers of filler material may be omitted from the inner shell during formation thereof so that there is a considerable difference between the outer diameter of the inner shell and the inner diameter of the outer shell, the basic shell wall thicknesses remaining unchanged. The two tubes are assembled and supported in spaced, concentric relation by means of appropriate adapters or jigs while a reinforcing filler of extened resinous material is introduced into the intermediate space between the shells. This filling media may be composed of a suitable casting resin containing low density particulate or spherical aggregates such as expanded clay, cellulated glass, or foamed minerals, or the resin per se may contain a gasifying agent for direct cellulation in situ. End caps are applied to the assembly which is thereafter subjected to spin casting to insure even distribution of the resin and bond between the inner shell, the filler core and the outer shell as the resin matrix is cured and integrated.

A wide variety of materials which can be polymerized or condensed to form resinous solids may be employed in the several elements of my invention. The polyester resins, such as the unsaturated acid esters of polyglycols, the esters of unsaturated alcohols and polycarboxylic acids, the liquid condensation products of phenols and aldehydes, the urea resins, the epoxy or bisphenols and the polyvinyls are typical of materials applicable to the invention. Mixtures of these resinous materials with themselves or with various modifying additives such as plasticizers, fillers, pigments, catalysts and the like are contemplated. The use of two or more separate resins in different portions of the composite pipe is also contemplated as when it is desired to obtain special acid and/or chemical resistant film liners or sheathings. The amount of resinous materials used in the formation of the composite pipes may be varied within wide limits and will depend not only upon the nature of the resin, but also upon the character and amount of the reinforcing fibers, tapes, and fillers employed in combination therewith as well as the properties which are desired in the ultimate product.

Manifestly, it is essential that the resinous materials employed in forming the elements of the composite pipe be capable of bonding adhesive to each other and, where the shells are formed of different plastics and perhaps include additional reinforcement of metal, care must be taken in the selection of the resins. Resin compatability of this sort, however, has been thoroughly explored and the proper resin combinations are easily determined.

It is also to be expected that the time, tetmperature and pressure required to unite the several elements of the composite pipe are variable within wide limits depending also upon the nature and amount of resinous material combined with the reinforcing and filling media.

Using the procedures described herein there is effected the substantially continuous production of a composite pipe having an inner shell of high strength material wound on one hand and an outer shell of high strength material wound on the opposite hand, the shells being united by a filler of light weight material having a high compressive strength. Not only can the composite pipe of my invention be made rapidly but the ultimate product will have a uniformity of physical values hithertofore considered unattainable.

It will at once be obvious that many modifications in procedural details are possible without departing from the spirit of the invention or the scope of the appended claims.

What I claim is:

1. In a method of making a composite tubular pipe, the steps of forming at least two spirally wound tubes from a plurality of continuous tapes of fibrous materials impregnated with a heat curable resinous material, one of said tubes carrying a superposed layer of resin impregnated filler media, the outer diameter of such tube and its added layer being slightly less than the interior diameter of the other tube, applying a layer of heat curable resin adhesive to the surface of the tube of lesser diameter, inserting said tube of lesser diameter into the other of said tubes in telescopic relationship, and heating the assembly to unite the several elements thereof and to cure the resin matrix in situ.

2. In a method of making a composite tubular pipe, the steps of forming at least two spirally wound tubes from a plurality of continuous tapes of fibrous materials impregnated with a heat curable resinous material, one of said tubes carrying a superposed layer of resin impregnated filler media, the outer diameter of such tube and its added layer being slightly less than the interior diameter of the other tube, applying a layer of heat curable resin adhesive to the surface of the tube of lesser diameter, inserting said tube of lesser diameter into the other of said tubes in telescopic relationship, and spin curing the assembly under heat and high velocity rotation to force the resinous material contained in the inner tube, the intermediate filler layer and its surface layer into contact with the inner surface of the outer tube during the curing cycle.

3. A process of making a composite tubular pipe as defined in claim 2, in which the tube of greater diameter is cured prior to its inclusion in the composite pipe assembly.

4. In a method of making a composite tubular pipe, the steps of forming at least two spirally wound tubes from a plurality of continuous tapes of fibrous materials impregnated with a heat curable resinous material, the outer diameter of one of said tubes being less than the inner diameter of the other tube, assembling said tubes in spaced concentric relationship with a reinforcing filling of extended resinous material therebetween, and spin curing the assembly under heat and high velocity rotation to integrate the several resin components of the assembly during the curing cycle.

References Cited in the file of this patent

UNITED STATES PATENTS

| | | |
|---|---|---|
| 1,161,756 | Wolever | Nov. 23, 1915 |
| 2,473,875 | Goldman | June 21, 1949 |
| 2,614,058 | Francis | Oct. 14, 1952 |
| 2,638,429 | Patterson | May 12, 1953 |
| 2,710,026 | Stewart et al. | June 7, 1955 |
| 2,739,917 | Schulze | Mar. 27, 1956 |